INVENTOR
FRANK ZANKL
RICHARD E. STOBBE
CLYDE E. MATTSON
ATTORNEY

INVENTOR
FRANK ZANKL
RICHARD E. STOBBE
CLYDE E. MATTSON
ATTORNEY

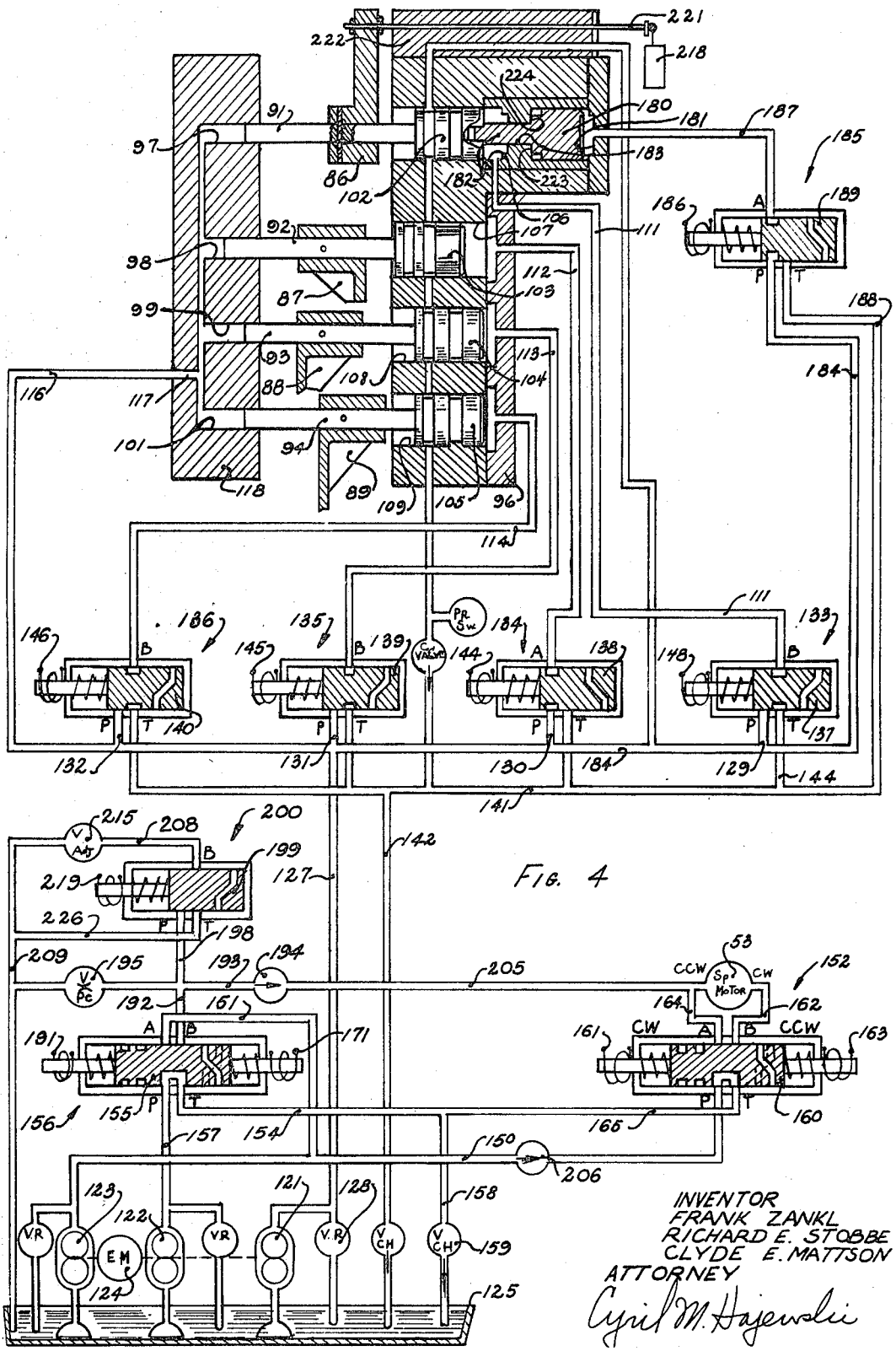

United States Patent Office 3,422,724
Patented Jan. 21, 1969

3,422,724
MECHANISM FOR EFFECTING ANGULAR
ORIENTATION OF A MACHINE TOOL
SPINDLE
Frank Zankl, Milwaukee, Richard E. Stobbe, Greenfield, and Clyde E. Mattson, Waukesha, Wis., assignors to Kearney & Trecker Corporation, West Allis, Wis., a corporation of Wisconsin
Filed Nov. 21, 1966, Ser. No. 595,827
U.S. Cl. 90—11                                               11 Claims
Int. Cl. B23b 1/00

ABSTRACT OF THE DISCLOSURE

A mechanism for always stopping the rotation of a machine tool spindle in the same angular position by means of a keyway on a spindle driving gear being moved into engagement with a fixed key to stop rotation of the spindle at the predetermined angular position. When the key and keyway engagement is effected the power to the drive gear is reduced to minimize the strain on the key.

---

The present invention relates generally to machine tools and more particularly to an improved machine tool having a rotatable spindle provided with means to stop the spindle in a predetermined angularly orientated position.

It is a general object of the present invention to provide a machine tool with mechanism to effect angular positioning of the machine spindle into a predetermined position.

It is another object of the present invention to provide an improved machine tool having automatic means for stopping a rotary operating spindle in a predetermined angular position.

It is yet another object of the present invention to provide an improved machine tool having mechanical means for stopping a rotatable machine spindle in a predetermined angular position.

Still another object of the present invention is to provide an improved machine tool having means for stopping the machine spindle in a predetermined angular position in response to the operation of a spindle speed transmission shifting into a creep speed drive.

A further object of the present invention is to provide means automatically operable to drive the spindle at a creep speed and to effect the operation of mechanical means to effect the positioning of the machine tool spindle in a predetermined angularly orientated position.

According to this invention, the improved machine tool is equipped with a rotary spindle and a plurality of tools which are each provided with a radially extending drive key that is adapted to engage an internal keyway formed in the tool receiving socket of the spindle to effect a positive driving engagement therebetween. The tools are stored in an indexable storage magazine in predetermined angularly orientated positions for selective location at a tool change station. At the tool change station a tool transfer member will operate to effect an interchange of a tool in the magazine located at the tool change station and the spindle. With the tool disposed in a predetermined angularly orientated position in the magazine, the spindle of the machine will be positioned so as to locate the keyway therein in a predetermined angular position to receive the key in the tool upon the transfer of the tool from the magazine to the spindle. Further, with the spindle in the predetermined angular position, the previously used tool from the spindle will be orientated so that the driving key thereon is in a correct angularly orientated position with respect to a keyway in the storage socket of the magazine located at the tool change station and in which the tool from the spindle will be inserted by the transfer member.

To effect the positioning of the spindle into the predetermined angularly orientated position, the spindle is driven at a relatively low speed rate. At this time, the spindle driving gear is urged in an axial direction to mesh a single axial keyway with a fixed key or stop. When meshing of the driving gear keyway with the fixed key is accomplished, the axial urge applied to the driving gear is continued. However the power for driving the spindle is reduced to a value which is sufficient to maintain positive engagement between the driving gear keyway and the fixed key. In this manner, the spindle is located and held in the predetermined angular position so that its keyway is properly orientated to receive the driving key of the tool transferred from the magazine to the spindle. Upon completion of a tool interchange operation, the axial urge applied to the spindle drive gear is removed and the gear is moved axially in the opposite direction to thereby disengage its axial keyway from the fixed stop. Thereafter, the normal driving function of the spindle drive gear is reinstated wherein it may be shifted from the low speed range to a relatively high speed range.

The foregoing and other objects of this invention, which will become more fully apparent from the following detailed description, may be achieved by the exemplifying apparatus depicted and set forth in the specification in connection with the accompanying drawings, in which:

FIG. 4 is a schematic view of the hydraulic control circuit utilized to effect the angular orientation of the spindle into a predetermined angular position and showing a portion of the electrical control circuit associated therewith.

Figure 1:
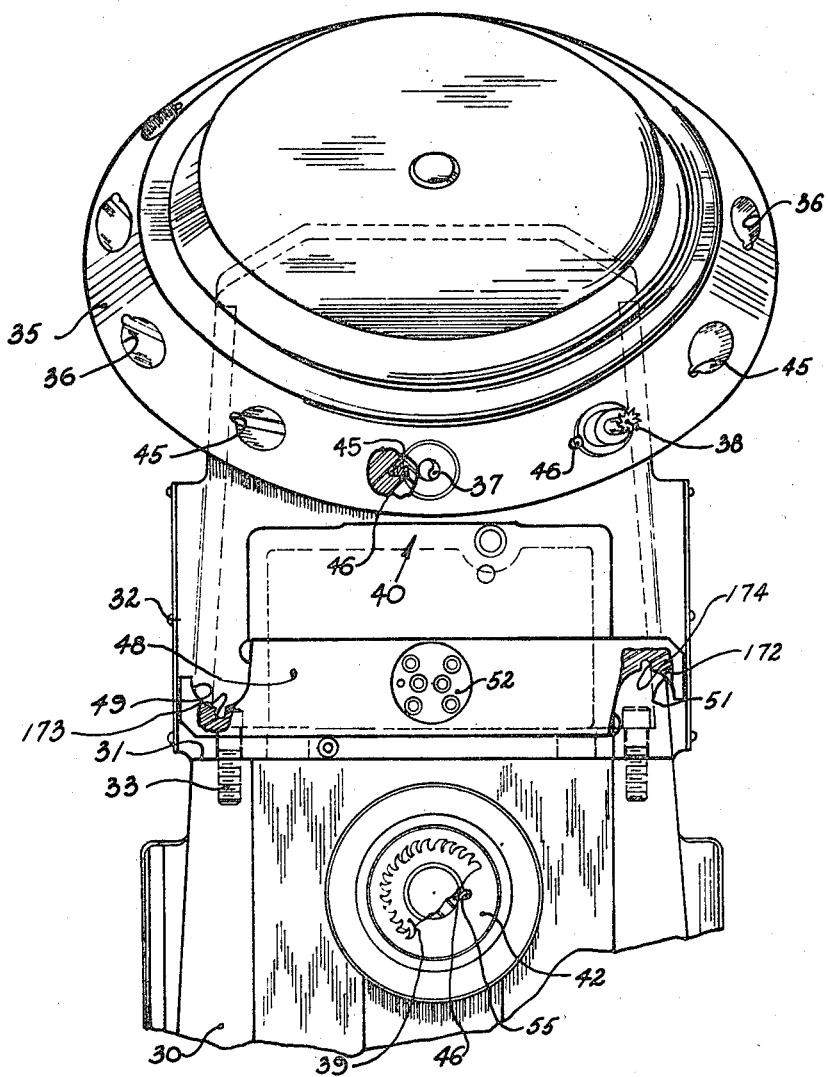
FIG. 1 is a view in front elevation of the upper portion of a machine tool in which the invention has been incorporated.

Reference is now made to the drawings and more specifically to FIGURE 1 thereof illustrating a machine tool incorporating the various features of the present invention. As there shown, the machine generally comprises a base (not shown), having a vertical column 30, presenting an upper flat surface 31. A frame 32, having a complementary flat surface abutting the surface 31, is secured to the column 30 by means of threaded bolts 33. A tool storage magazine 35 is rotatably supported on the upper portion of the frame 32 in an inclined plane. The storage magazine is provided with a beveled periphery having a plurality of peripherally spaced bored openings 36 formed therein and consttiuting storage sockets for carrying tools, such as tools 37, 38 and 39, which are selectively moved into a tool change station generally identified by the reference numeral 40. The axes of the bored openings or sockets 36, with respect to the axis of drum rotation, is such that when a tool carried within a bored opening 36 is in the tool change station 40, the longitudinal axis of the tool is parallel with the longitudinal axis of the spindle 42. Each of the storage sockets 36 formed in the magazine 35 is provided with a keyway 45 which is adapted to receive a key 46 provided on the periphery of the tool, such as the tools 37, 38 or 39. With the construction shown in FIGURE 1, when a socket 36 is in the tool change station 40, the keyway 45 thereof will be in a horizontal plane or at a "9 o'clock" position.

The frame 32 also carries for relative bodily movement a tool change member or arm 48 presenting semicircular tool gripping recesses 49 and 51 at its opposite ends. The tool change arm 48 is secured to the outer end of an axially and rotatably movable shaft 52 which is carried in the frame 32 in bodily spaced relationship relative to the storage magazine 35 and the tool receiving spindle 42 which is rotatably mounted in the column 30. The spindle 42 is rotatably driven by a hydraulic motor 53, shown in FIGS. 2 and 4, and releasably carries a tool, such as the tool 39 shown in FIGS. 1 and 2. The spindle 42 is provided with a keyway 55 which is adapted to receive the key 46 of the tool 39 to provide a positive driving connection between the spindle and the tool therein. An interchange of tools between the magazine 35 and the spindle 42 will be effected by the operation of the arm 48 when it is rotated from its horizontal parked position to a vertical position wherein the grip 49 engages with a tool 37 in the magazine and the grip 51 engages with the tool 39 in the spindle 42. Axial outward movement of the arm 48 is effected to withdraw the tools 37 and 39 simultaneously, and upon complete withdrawal of the tool from the socket of the magazine in the tool change station 40 and the spindle 42, the arm 48 is caused to rotate in a clockwise direction 180° to interchange the position of the tools. Upon completion of 180° of rotation of the arm 48 the tool 37 will be in axial alignment with the spindle 42, while the previously used tool 39 will be in axial alignment with a socket of the magazine at the tool change station 40. Thereafter, the arm 48 will be retracted to move it inwardly, inserting the tool 39 into a storage socket at the tool change station and the tool 37 into the spindle 42. The arm, thereafter, will be rotated in a counterclockwise direction to its horizontal parked position, as depicted in FIGURE 1. Since the tool change arm 48 per se is not a part of this invention as such, the precise mechanism for effecting the operation of the arm 48 in a tool interchange cycle of operation has not been shown, nor is it described in detail herein. A more detailed description of the tool change arm 48 may be had by referring to U.S. Patent 3,218,706 issued Nov. 23, 1965 to Frank Zankl et al.

The tool spindle 42 is rotatably carried by the column 30 in bodily spaced relationship relative to the arm 48 in a manner that the axis of the spindle and the longitudinal axis of the arm recesses 49 and 51 coincide whenever the carrier or arm is pivoted from its horizontal parked position to a vertical tool engaging position. The spindle 42 comprises essentially an elongated tubular shaft 61 rotatably supported in antifriction bearings 62 and 63 that are mounted in suitable openings in the interior portions of the column 30.

The drive from the spindle motor 53 is transmitted to the spindle 42 through a variable speed transmission mechanism generally identified by the numeral 65. The transmission 65 is selectively connectible to one or another of spur gears 67 or 68 which constitutes an axially shiftable gear cluster 69.

The gear cluster 69 is splined to the spindle shaft 61 in a manner to be axially shifted for selectively engaging either the spur gear 67 or spur gear 68 with the output gear 71 or 72, respectively, of the transmission 65. The gear cluster 69 serves as a range changer whereby the output speeds of the transmission 65 may be utilized to drive the spindle 42 either in a low range through the intermeshed relationship of the output gear 71 and the spur gear 67, or in a high range by shifting the gear cluster 69 leftwardly from the position it occupies in FIGS. 1 and 3 so as to engage the spur gear 68 with the output gear 72.

Figure 2:
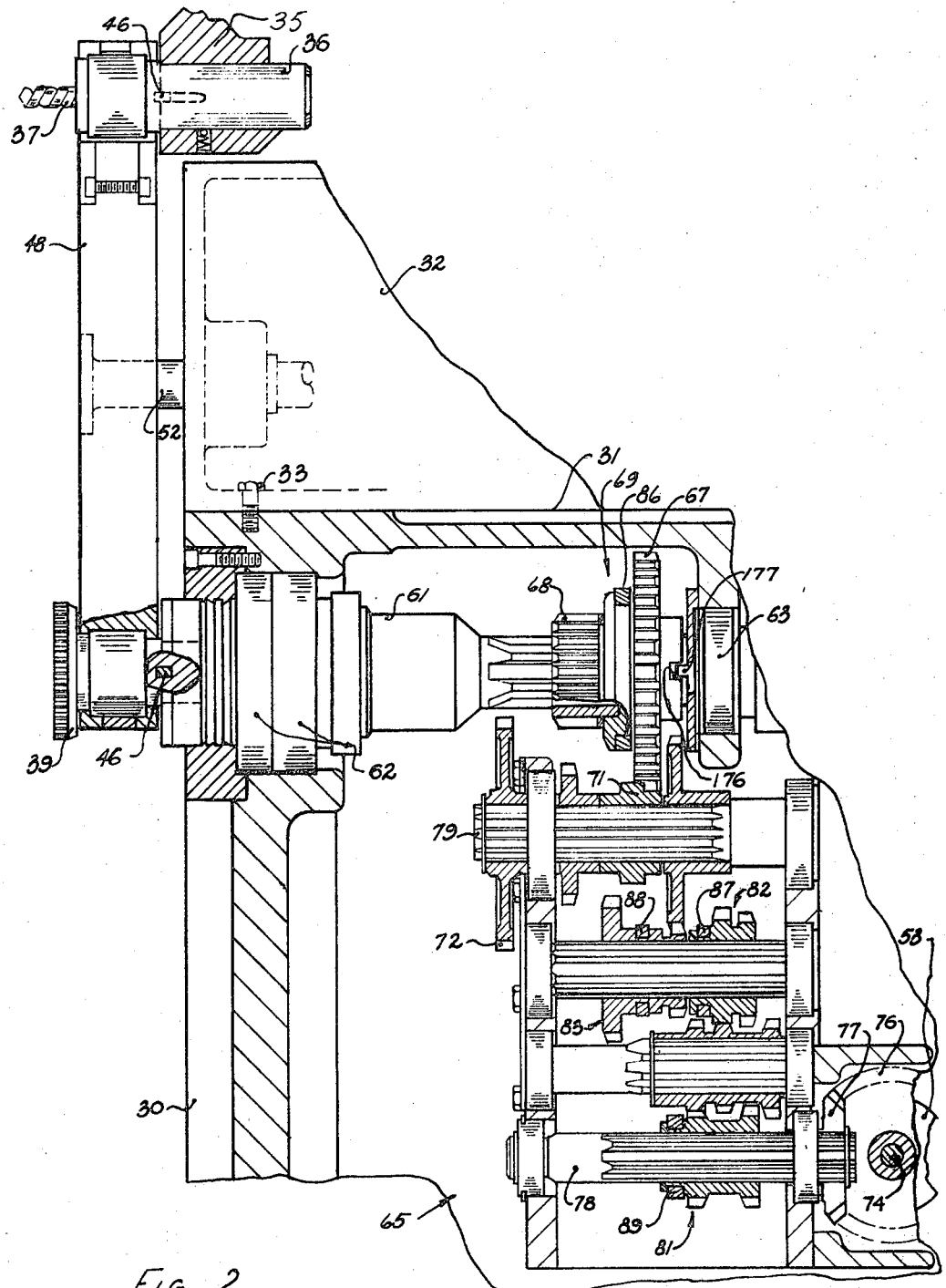
FIG. 2 is an enlarged fragmentary view partly in transverse section through the upper portion of the machine and partly in elevation showing the keys and keyways of tools in storage in the magazine and a tool in the spindle and also showing the spindle, a range changer, drive gear cluster, and the fixed stop for effecting angular orientation of the spindle.

As previously mentioned, the variable speed transmission 65 is driven by the hydraulic motor 53 and to this end the motor 53 is provided with an output shaft 74 on which a bevel gear 76 is keyed to rotate with the motor shaft 74. Power from the motor bevel gear 76 is transmitted to the transmission via an input bevel gear 77 that is keyed to drive a first shaft 78 of the transmission 65. The power input to the shaft 78 of the transmission 65 is transmitted to an output shaft 79 of the transmission 65 through a plurality of shiftable speed changing gear clusters adapted to be shifted into meshing engagement with fixed gearings on other shafts of the transmission. As depicted herein, the transmission 65 has three shiftable gear clusters, 81, 82 and 83, each of which is shiftable from the normal position that it occupies, as depicted in FIG. 2, to a shifted position, to individually impose another particular gearing ratio on the transmission drive. The gear clusters 81, 82 and 83 may be shifted individually or in various combinations selectively to attain a desired spindle speed within the range of the transmission itself. The output speeds of the transmission 65 may be utilized either in a relatively high range by shifting the spindle gear cluster 69 leftwardly so that the high speed gear 68 is meshed with the gear 72 of the transmisson 65, or may be utilized in the relatively low range of speed by moving the gear cluster 69 rightwardly to the position it occupies, as depicted in FIG. 2, thereby engaging the gear 67 with the gear 71 of the transmission.

Each of the gear clusters has an annular shifting fork engaging groove, such as the groove 84, provided on the gear cluster 69 and is shiftable by means of shifting forks 86, 87, 88 and 89, which are mounted on shifter rods 91, 92, 93 and 94, respectively. Thus, axial movement of the shifter rod 91 operates to effect the axial shifting movement of the gear cluster 69; the shifter rod 92, associated with the gear cluster 82, operates to shift the gear cluster 82 axially; the shifter rod 93 is associated with the gear cluster 83 and operates to effect the shifting movement of that gear cluster; and, the shifter rod 94 is operatively connected to effect the shifting movement of the gear cluster 81.

Each of the shifter rods 91 to 94, inclusive, are mounted for slidable movements in bores of the frame 96 from a normal rightward position, as depicted by the positions of the shifter rods 91, 93 and 94, into a leftward position, as depicted by the position of the shifter rod 92. As depicted in FIG. 4, the lefthand end of each of the rods 91, 92, 93 and 94 constitute relatively small diameter pistons movable within cylinders 97, 98, 99 and 101, respectively, which are simultaneously supplied with pressure fluid, as will hereinafter be described.

On the other hand, the righthand end of the rods 91, 92, 93 and 94 are each provided with an enlarged end constituting large diameter pistons 102, 103, 104 and 105, respectively. The pistons 102, 103, 104 and 105 are selectively supported within cylinders 106, 107, 108 and 109 which constitute cylinders that are formed within the righthand end portion of the frame 96. Each of the cylinders 106 to 109, inclusive, is provided with individual fluid lines 111 to 114, inclusive, for supplying pressure fluid to the cylinders selectively for moving the pistons, and thereby the shifter rods associated therewith, leftwardly from their normal rightward positions. As previously mentioned, the cylinders 97, 98, 99 and 101 in which the relatively small diameter pistons 91, 92, 93 and 94, respectively, are slidably supported are adapted to receive pressure fluid simultaneously from a common conduit 116 which is connected to a passage 117 formed in a manifold cover 118 of the transmission frame 96. Thus, pressure fluid supplied to the passage 117 via the conductor 116 is supplied to the cylinders 97, 98, 99 and 101 simultaneously so that the pressure fluid acts on the small diameter ends of the pistons 91, 92, 93 and 94, respectively, to urge them rightwardly. Any one of the shifter rods, or any combination of them, can be moved leftwardly by selectively supplying pressure fluid to the fluid lines 111 to 114, inclusive. Due to the larger area of the pistons 102 to 105, inclusive, pressure fluid applied to the ends thereof will overcome the pressure in their associated respective cylinders 97, 98, 99 or 101, so that the associated shifter rods will be moved leftwardly. When the pressure fluid is discontinued to any one of the cylinders 106 to 109, inclusive, the pressure in the associated relatively small diameter cylinders, acting on the smaller area of the piston rods, will immediately react to urge the shifter rods rightwardly to their normal positions.

Thus, axial movement of the gear cluster 81 is effected by the axial movement of the shifter rod 94 through the shifter fork 89; the axial shifting movement of the gear cluster 83 is effected by the axial operation of the rod 93 through the connected shifter fork 88; the gear cluster 82 is moved axially by operation of the shifter rod 92 which is connected by means of the shifter fork 87 to the cluster; and, the axial movement of the range change gear cluster 69 is effected by operation of the shifter rod 91 which is connected to the gear cluster via the shifter fork 86. It is apparent, therefore, that axial movement of any one of the shifter rods 91 to 94, inclusive, will effect the corresponding movement of the associated shifter forks thereby effecting axial movement of the related gear clusters.

Operation of the shifter rods 91 to 94, inclusive, is effected by pressure fluid that is supplied to a fluid system from a plurality of pumps 121, 122 and 123, all of which are connected to be simultaneously driven by a single electric motor 124. For operating the shifter rods 91 to 94, inclusive, fluid from a reservoir 125 is withdrawn therefrom by the pump 121 and delivered under pressure to a supply line 127. The pressure fluid in the line 127 flows into branch lines 129, 130, 131 and 132 which are connected to inlet ports of solenoid actuated valves 133, 134, 135 and 136, that are selectively operable to control the flow of pressure fluid to the individual large cylinders 106, 107, 108 and 109, associated with the shifter rods 91 to 94 inclusive, respectively, via connected lines 111 to 114 inclusive, respectively. The plungers 137 to 140, inclusive, of the solenoid valves 133 to 136, inclusive, are normally disposed in their rightward positions within the valve body, as depicted in FIG. 4 with the plungers thereof being urged rightwardly by means of springs located within each of the valve bodies and acting on the plunger to urge it to the right.

Selective operation of the valves 134, 135 and 136 is accomplished by energizing associated solenoids 144, 145 and 146, respectively. In the particular transmission illustrated, the normal condition of the speed establishing gear clusters is such that the transmission is normally set for the lowest output speeds. To this end, the gear cluster 82 must be urged into its leftward position, as depicted in FIG. 2. To effect such positioning of the gear cluster 82, the shifter rod 92 must be in an axial leftward position, as depicted in FIG. 4. Consequently, the control valve 134 associated with the shifter rod 92 is constructed and arranged so that with its associated solenoid 144 deenergized, the valve is positioned to direct pressure fluid to the large cylinder 107 thereby effecting the leftward movement of the shifter rod 97. On the other hand, the valves 135 and 136 are constructed and arranged in a manner that when their associated solenoids 145 and 146 are deenergized, the valve plungers will be positioned so as to connect the cylinders 108 and 109, respectively, to the reservoir 125 via the connecting return lines 141 and 142.

With the control valves 134, 135 and 136 operated so as to establish a selected desired output speed, the range gear cluster 69 will be shifted so as to establish the range in which the desired output speed will be utilized. To this end, the control valve 133 is selectively operable to effect the axial movement of the shifter rod 91 to move the gear cluster 69 leftwardly from its low range position to a high range position wherein the gear 68 is meshed with the output gear 72 of the transmission. Operation of the control valve 133 is effected by means of an associated solenoid 148. With the solenoid 148 deenergized, the valve plunger 137 will be positioned so as to connect the fluid line 111 to the branch return line 144. With the control valve 133 positioned as described, the pressure fluid in the small diameter cylinder 97 will operate to effect the movement of the shifter rod 91 rightwardly, as viewed in FIG. 4, so that the rod is moved to the position depicted therein. Under this condition, the gear cluster 69 will be moved axially rightwardly on the spindle shaft 61 to the position depicted in FIG. 3, wherein the gear 67 of the gear cluster is in meshing engagement with the output gear 71 of the transmission, as shown in FIG. 2. On the other hand, when it is desired to drive the spindle 42 at a speed in the high range, the solenoid 148 associated with the valve 133 is energized and operates to effect leftward movement of the valve plunger 137, as viewed in FIG. 4, so that it operates to connect the branch supply line 129 to the fluid line 111. The pressure fluid flowing into the fluid line 111 will be directed by the line to the large diameter cylinder 106 at the head end of the piston 102 thereof. The pressure fluid supplied to the cylinder 106 will effect the leftward movement of the shifter rod 91 thereby effecting leftward axial movement of the gear cluster 69, as viewed in FIG. 2, to effect the meshing engagement of the gear 68 with the output gear 72 of the transmission. With the gear cluster 69 in the leftward position, the output of the transmission 65 will be in a higher range. It is apparent, therefore, that the transmission in cooperation with the range change gear cluster 69 is capable of sixteen different speeds at which the spindle may be driven.

In addition to this, the spindle motor 53 may be driven in a selected one of two speeds by varying the amount of pressure fluid supplied to the motor. To operate the motor 53 at its lowest speed, the output of the pump 123 is directed into a supply line 150 which has its opposite end connected to the inlet port of a directional flow control valve 152.

The pressure fluid supply line 150 has a fluid by-pass line 151 connected thereto with the opposite end of the line 151 being connected to a top side port of a speed control valve 156. However, when it is desired to operate the motor 53 at its lowest operating speed, the control valve 156 is deactivated so that its plunger 155 is in a center position wherein it operates to effectively block the two top side ports in the valve 156 and place a fluid supply line 157 in communication with a branch return line 154. The branch return line 154, in turn, communicates with a common return line 158 which leads to the reservoir 125 and in which a check valve 159 is interposed. With the valve 156 deactivated, the entire output of the pump 123 will be directed through the line 150 to the inlet port of the directional control valve 152. Assuming that the spindle 42 is to be driven in a clockwise direction, a solenoid 161 associated with the valve 152 will be energized. With the solenoid 161 energized, the valve plunger 160 will be moved leftwardly thereby placing the fluid line 150 in communication with a line 162 that is connected to a port of the valve and to a port of the motor 53. The pressure fluid supplied to the motor 53 from the pump 123 via the line 162 will operate the motor 53 at its lowest operating speed and in a direction to rotate the spindle in a clockwise direction.

Exhaust fluid from the motor 53 will flow into a line 164 which has its opposite end connected to a port of the valve 152. With the plunger 160 of the valve in a leftward position, the valve will operate to direct the exhaust fluid into a connected line 165 that, in turn, is connected to the return line 158.

With the motor 53 being operated at its lowest operating speed, the output of the pump 122 is by-passed to the reservoir 125. To this end, fluid from the pump 122 is directed into a connected line 157 which has its opposite end connected to the inlet port of the speed selecting valve 156. Since the motor 53 is operating at its lowest speed, the valve plunger 155 will be in its centered position and operates to place the line 157 in communication with the branch return line 154. Thus, the output of the pump 122 is by-passed to the reservoir 125 while the output of the pump 123 is utilized to drive the motor 53 at its lowest operating speed.

On the other hand, when it is desired to operate the motor 53 at its highest operating speed, the valve 156 is operated by energizing an associated solenoid 171 to effect the rightward positioning movement of the valve plunger 155 so that the pressure fluid line 157 is connected to the line 151 which, in turn, is connected to the pressure line 150. Thus, with the solenoid 171 energized, the valve 156 is operated to direct the output of the pump 122 into the line 150 where it combines with the output from the pump 123. The combined output of the pumps 122 and 123 is directed to the valve 152, and by operation of the valve 152, is directed to the motor 53 to effect its operation at its highest operating speed and in a counterclockwise or clockwise direction as desired.

Should it be desired to rotate the spindle 42 in a counterclockwise direction, another solenoid 163 associated with the directional control valve 152 will be energized. With the solenoid 163 energized, the valve plunger 160 will be moved rightwardly from its center position. With the valve plunger 160 in its rightward position, the valve will operate to place the fluid supply line 150 in communication with the line 164. Thus, the output of the pump 123, or the combined output of both of the pumps 122 and 123 as previously described, will be supplied to the motor 53 via the line 164 to effects its operation in a direction to rotate the spindle 42 in a counterclockwise direction.

As previously mentioned, with the illustrated machine each tool utilized in the spindle 42 is positively driven by the spindle through the operation of a keyway and a key engaged therein. As shown in FIGS. 1 and 2, the spindle 42 is provided with a keyway 55 which is adapted to receive a key 46 that is secured to the peripheral surface of the shank of the tools. It is therefore apparent that each tool when in storage in the sockets 36 of the magazine 35 must be angularly orientated so that upon subsequent transfer to the spindle 42, the transfer movement will not only serve to align the tools axially for insertion into the spindle, but will also serve to position the tools so that the keys 46 thereon are positioned for engagement in the keyway 55 of the spindle 42. Thus, each storage socket in the magazine 35 is provided with a keyway 45 that is located with respect to the axis of the socket at a position referred to herein as "9 o'clock" when the particular socket is in the tool change station 40. Thus, a tool, such as the tool 37, in the storage socket at the tool change station 40 will be positioned so as to have the key 46 associated therewith located in the "9 o'clock" position. With this condition existing, the spindle 42 must always be stopped in the same predetermined angular position so that the keyway 55 thereof is located with respect to the spindle axis at a position herein preferred to as "3 o'clock" position. Under this condition, the operation of the tool change arm 48 in a tool interchange movement will rotate the tool withdrawn from the socket of the magazine at the tool change station 40 bodily 180°. This 180° of bodily movement of the tool will position the key 46 associated with the particular tool at the "3 o'clock" position when the tool has been bodily moved into axial alignment with the spindle 42. In this position, the key 46 of the tool will be in position to engage in the keyway 55 of the spindle 42 also located at the "3 o'clock" position. Simultaneously, the previously used tool withdrawn from the spindle 42 will be rotated bodily 180° thereby positioning the key thereon at a "9 o'clock" position for engaging in the keyway 45 of a socket located at the tool change station 40.

To insure that the tools, such as the tools 37 and 39, when bodily rotated by the arm 48 in a tool interchange operation, will not rotate about their own axes while in the tool gripping recesses 49 and 51, the rear closure plate 172 of the arm 48 adjacent the recesses 49 and 51 is provided with slots 173 and 174. The slots 173 and 174 are located so that when the arm 48 is rotated to a vertical tool engaging position, the slot 173 will engage with the key 46 of the tool of the storage magazine 35 located at the tool change station 40. On the other hand, the slot 174 associated with the recess 51 will engage with the key 46 of the tool in the spindle 39. Thus, when the arm 48 is operated to interchange the position of the tools, the tools in the arm recesses 49 and 51 cannot rotate within the recesses, being prevented from doing so by the interengagement of the keys 46 in the slots 173 and 174 associated with the recesses.

Figure 3:
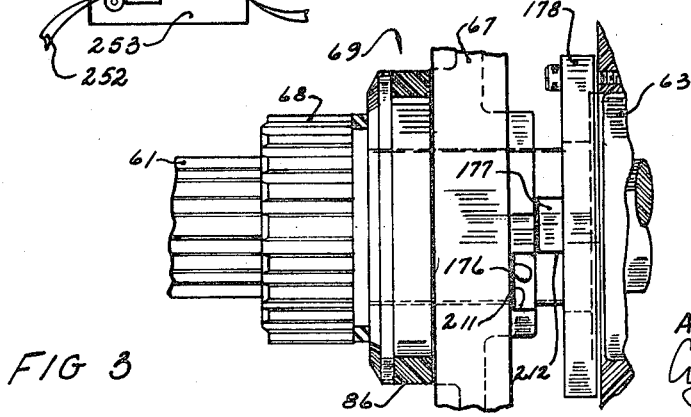
FIG. 3 is a detailed fragmentary view of the range changer gear cluster showing it in spindle low range drive position and its relationship to the positive angular spindle positioning stationary keys prior to spindle positioning.

Angular orientation of the spindle 42 to position the keyway 55 thereof at the "3 o'clock" position, may be accomplished every time a tool change is to be effected; or may be selectively effected only when a tool at the tool change station 40 to be transferred to the spindle 42 is provided with a key 46; or, conversely, when the tool in the spindle is provided with a key and is to be replaced in the storage socket in the magazine 35. To effect the positioning of the spindle 42 to the same predetermined angular position, the gear cluster 69 is moved when in its low range position, as depicted in FIGS. 2 and 3, an additional amount to the right so that it is moved from the low range position that it occupies in FIG. 3 rightwardly into the position depicted in FIG. 2. With the gear cluster 69 positioned as depicted in FIG. 2, a keyway 176 formed in the axial rightwardly extending end of the hub of the gear cluster 69 is adapted to mesh with a projecting key or tooth 177 formed on a stationary ring 178 that is secured to a depending web in which the bearing 63 is mounted. When the gear cluster 69 has moved to its furthermost rightward position wherein the keyway 176 is meshed with the tooth or key 177, the gear 67 of the cluster is maintained in meshing engagement with the gear 71. The key 177 is positioned so that its axis is disposed in the same horizontal plane that passes through the axis of the spindle and the spindle keyway 55 when the spindle keyway 55 is at the "3 o'clock" position. Thus, when engagement between the gear cluster keyway 176 and the stationary key 177 is effected, the spindle 42 will be positively locked in the desired predetermined angularly orientated position.

The additional axial rightward movement of the gear cluster 69 is effected by means of the shifter rod 91 which is normally operable to selectively effect a shifting of the gear cluster into its low or high range position, as previously described. The normal operating position of the shifter rod 91 between its axial leftward high range position and its normal axial rightward low range position is established by means of a positive stop piston 180 that is axially movable in a cylinder 181 formed in the block of the righthand portion of the frame 96. The piston 180 is provided with a leftwardly extending rod portion 182 that extends through a bored opening 183 provided in the block. The rod 182 is adapted to extend into the cylinder 106 of the large piston 102 sufficiently far so as to engage the head end of the piston 102 to extablish the limit of rightward travel for the piston 102 when the piston 180 is in its extreme leftward position. Thus, with the piston 180 in its leftward position, the rod 182 is extended into the cylinder 106 sufficiently far to establish the rightward position of the piston 102 thereby limiting it to its normal low range position. Under normal operating circumstances, pressure fluid is applied to the cylinder 181 at the head side of the piston 180 for maintaining the piston 180 in its leftward position. To this end, pressure fluid from the pump 121 is directed into the line 127 and will flow into a common distribution line 184 which, in turn, has its extreme rightward end connected to an inlet port of a solenoid operated control valve 185.

The solenoid 186 associated with the valve 185 is normally maintained deenergized so that a plunger 189 of the valve is spring biased to a full rightward position. With the plunger 189 in its rightward position, the valve 185 operates to direct the pressure fluid in the line 184 into a connected line 187 which has its opposite end connected to the cylinder 181. Thus, in the normal speed changing operation of the transmission 65, the piston 180 is always maintained in its leftward position thereby establishing the limit of rightward movement permitted to the shifter rod 91 when it is moved to its low range position. However, when angular orientation of the spindle is to be effected, the solenoid 186 is energized so that the plunger 189 of the valve is moved leftwardly thereby connecting the line 187 to a return line 188 which, in turn, is connected to the common return line 141. With the solenoid 186 of the valve 185 energized, the cylinder 181 in which the stop piston is movable will be connected to the fluid reservoir 125 and the piston 180 is free to move rightwardly in its cylinder 181. Assuming now that the solenoid 148 associated with the valve 133 had been previously deenergized so that the plunger 137 of the valve is in its rightward position as depicted, the cylinder 106 in which the piston 102 is movable will also be connected to the return line 141 via the line 144. With this condition obtained, the pressure fluid in the small cylinder 97, acting on the small diameter end of the shifter rod 91, will urge the shifter rod 91 a slight distance further rightwardly. Thus, the gear cluster 69 will be moved axially rightwardly from the position it occupies as depicted in FIG. 3 to the position depicted in FIG. 2 wherein the keyway 176 engages with the stationary key 177. When such engagement between the keyway 176 and key 177 is effected, the spindle 42 will be anguarly orientated in the predetermined desired position wherein its keyway 55 is located at the "3 o'clock" position.

Angular orientation of the spindle 42 is accomplished with the spindle motor 53 operating at the creep speed which is lower than its normal operating low speed. Since the spindle motor 53 is selectively operable in either direction for driving the spindle in a clockwise or counterclockwise direction, a particular direction of motor operation has been selected for effecting angular orientation of the spindle 42. For this purpose, the motor 53 will be operated in the direction to drive the spindle 42 in a counterclockwise direction of rotary motion, as viewed in FIGURE 1. For the purpose of this description, it will be assumed that the operational direction of both the motor 53 and the spindle 42 are the same so that reference to a rotational direction will apply to both the motor 53 and the spindle 42.

Operation of the spindle motor 53 at a creep speed is effected through the operation of the speed selecting control valve 156. To this end, a solenoid 191 associated with the valve 156 is energized and operates to move the valve plunger 155 leftwardly to operate the valve 156 for directing pressure fluid from the line 157 into a connected line 192. The line 192, in turn, is connected to a line 193 which is interconnected between a check valve 194 and a pressure compensated flow control valve 195.

As depicted in FIGURE 4, the line 193 is also in communication with a branch line 198 which has its opposite end connected to an inlet port of a solenoid operated valve 200. At this time, the plunger 199 of the valve 200 is in its normal rightward position as depicted and serves to block fluid flow through the valve. Thus, the pressure fluid from the line 157 will be directed into the line 192 by operation of the valve 156 and will flow into the line 193. The pump 122, which supplies pressure fluid to the supply line 157, is a fixed displacement pump of smaller capacity than the pump 123. Since the motor 53 requires a relatively small portion of the fluid volume supplied by the pump 122 to effect its operation at a creep speed, the pressure compensated flow control valve 195 is set to bypass the excess volume of the fluid around the motor 53 and return it to the reservoir 125 via a connected return line 209. The balance of the fluid volume flows through the check valve 194 into a connected line 205 and is delivered to the motor 53 to effect its operation for driving the spindle at a creep speed. Simultaneously, with the energization of the solenoid 191 associated with the valve 156, the solenoid 163 associated with the directional flow control valve 152 is also energized. This, as previously mentioned, will effect displacement of the plunger 160 rightwardly so that the valve 152 operates to place the line 162 into communication with the return line 165. Thus, as pressure fluid is supplied to the motor 53 via the line 205 to effect its operation at a creep speed, the exhaust fluid from the motor 53 will flow into the line 162, and by operation of the valve 152, will flow into the line 165 to return to the reservoir 125.

The pressure fluid which is supplied to the motor 53 via the line 205 will also flow into the line 164, and by operation of the valve 152, will flow into the line 150. However, interposed in the line 150 is a directional check valve 206 which operates to prevent leftward fluid flow through the line 150. Therefore, the pressure fluid entering the line 150 via the valve 151 will serve to apply an additional closing force on the valve over and above the normal setting of the valve. Thus, at this time, the output of the high volume pump 123 will flow into the line 150, and since the check valve 206 is now operative to prevent the rightward flow of the fluid therethrough, the fluid will take the path of least resistance and will flow into the connected line 151. The pressure fluid from the line 151 will enter the valve 156 and by operation of the valve will be directed into the return line 154 and return to the reservoir 125 via the line 158.

Axial rightward shifting of the gear cluster 69 is accomplished by the fluid obtained from the variable displacement pump 121 which operates to maintain the fluid to the circuit at a constant pressure. At the same time, the motor 53 is operated in a counterclockwise direction at a creep speed by fluid from the fixed displacement pump 122. Thus, with the shifter rod 91 shifted rightwardly into its low range position and with pressure discontinued to the cylinder 181 wherein the positive stop piston 180 is free to move axially rightwardly, the continued urging of the shifter rod 91 rightwardly will serve to urge the gear cluster 69 a further distance rightwardly in an effort to engage the keyway 176 with the stationary key 177. In this additional rightward movement of the gear cluster 69, should the end face of the hub of the gear cluster abut the axial end face of the stationary key 177, the load on the motor 53 will be increased. As the load on the motor 53 increases, it tends to slow the motor. As a result, the pressure of the fluid supplied to the motor increases to increase the motor torque so as to maintain the motor operating to drive the spindle at a creep speed. When the gear cluster 69 has been rotated so as to axially align the keyway 176 with the stationary key 177, the continued pressure fluid on the left or small diameter end of the shifter rod 91 will serve to effect the meshing engagement of the keyway 176 with the key 177. Since the pump continuously operates to supply pressure fluid to the motor 53, an increased load on the motor, occurring as the result of a frictional engaging force between the keyway 176 and key 177, will cause the pump to alter its operative stroke in a manner to increase fluid pressure to the motor 53 to ensure a continued drive for the spindle at a creep speed. Since engagement of keyway 176 with key 177 positively locks the spindle against rotation, motor 53 thereafter cannot rotate the spindle and thus cause pump 122 to operate to provide such maximum output pressure which would result in damage to the circuitry, motor 53, and pump 122. Repeated operation of this type might cause key 177 to shear. To prevent damaging high pressures in the motor circuitry and to limit such pressures to a predetermined safe value, a pressure responsive sensing means is interposed in the circuit. In the machine depicted herein, such means includes an adjustable relief valve 215 operative to open at a predetermined pressure. The setting of the valve 215 is such to furnish fluid pressure to the motor 53 to maintain positive engagement between side faces of keyway 176 and key 177.

For this purpose, the relief valve 215 is selectively connected into the motor circuit when engagement between the keyway 176 and the key 177 has been accomplished. To this end, a means for sensing and signaling spindle angular orientation is provided and comprises a switch 218 which is secured within the column 30 adjacent the transmission 65. With the gear cluster 69 in its most rightwardly position, wherein the keyway 176 is engaged with the stationary or fixed key 177, as depicted in FIG. 2, the switch 218 will be actuated to effect the energization of a solenoid 219 associated with the valve 200. With the solenoid 219 energized, it will effect leftward movement of the valve plunger 199 so that the valve 200 operates to connect the fluid line 198 to a line 208. On this occurrence, a portion of the fluid, which is being directed to the motor 53, will flow through the valve 200 and the preset adjustable pressure relief valve 215 to return to the reservoir 125 via a connected line 209. Thus, the pressure in the line 193 will be limited to a predetermined value which is sufficient to maintain the motor operating so as to maintain the side face 211 of the key 176 in abutting engagement with the side face 212 of the fixed key 177.

Actuation of the switch 218 is effected by means of an actuating rod 221 that is slidably supported in a suitable bore provided in a transmission frame cap member 222. The rod 221 extends completely through the bore having one end adjacent the actuating plunger of the switch 221 and having its opposite end connected to the shift arm 86 associated with the shifter rod 91 and the gear cluster 69. As the shifter rod 91 is moved axially rightwardly to effect the axial rightward movement of the gear cluster 69, the actuating rod 221 will also be caused to move rightwardly. Thus, as the gear cluster 69 is moved rightwardly from the position depicted in FIG. 3 into the position depicted in FIG. 2, the rod 221 will be moved from the position it occupies, as depicted in FIG. 4, rightwardly an additional amount to thereby effect the actuation of the switch 218.

To release the spindle 42 so that it is free to be rotated from its angularly orientated position, the gear cluster 69 is moved leftwardly from the position it occupies as depicted in FIG. 2, to the position as depicted in FIG. 3, wherein the keyway 176 will be disengaged from the stationary or fixed key 177. In this position of the gear cluster 69, it is still in the low range position wherein the gear 67 is in mesh with the gear 71. Axial leftward movement of the gear cluster 69 is disengage the keyway 176 from the fixed key 177 is accomplished by deenergizing the solenoid 186 associated with the valve 185. With the solenoid 186 deenergized, the valve 185 is operated to place the pressure fluid supply line 184 in communication with the line 187. With this condition obtained, pressure fluid is directed into the cylinder 181 at the head end of the piston 180. Since the head area of the piston 180 is larger than the head area of the small piston end of the shifter rod 91 with the cylinder 97, the pressure fluid acting on the head end of the piston 180 will force the piston 180 to move leftwardly its full distance of travel wherein a shoulder 223 on the rod end of the piston 180 abuts the face 224 of the web through which the rod 182 of the piston 180 slidably extends. The piston 180 in being moved leftwardly will engage and force the piston 102 associated with the shifter rod 91 to move leftwardly. The shifter rod 91 in moving leftwardly will effect a like movement of the shifter fork 86 and thereby leftward movement of the gear cluster 69 to effect the disengagement of the keyway 176 from the stationary key 177.

Simultaneously with the deenergization of the solenoid 186 associated with the valve 185, the solenoid 191 associated with the motor speed control valve 156 and the solenoid 163 associated with the directional control valve 152 are deenergized. With this condition obtained, the plunger 155 of the valve 156 is returned to its center position so that the valve operates to place the pressure fluid line 157 in communication with the line 154 wherein the output of the pump 122 will be returned to the reservoir 125. Similarly, the output of the high volume pump 123 will also be returned to the reservoir 125 via the line 150, valve 152, line 165, and line 158.

Upon leftward displacement of the shifter rod 91, the shifter fork 86 will move with the shifter rod 91 and, in doing so, will effect leftward movement of the rod 221. As the rod 221 is moved leftwardly, it moves out of engagement with the actuating plunger of the switch 218 to release the switch. With the switch 218 deactuated it will effect the deenergization of the solenoid 219 associated with the valve 200 to reposition the valve plunger 199 to its normal operating position wherein it blocks the flow of pressure through the valve. With the valves 185 and 200 in their normal operating positions, as depicted in FIG. 4, the transmission 65 is conditioned for normal operation wherein the spindle may be driven at any selected speed within the range of the transmission 65.

It is apparent that the valve 200 serves as a permissive control which allows the pressure to the motor 53 to be increased so that the torque of the motor will increase whenever the load on the motor increases as it is operating to drive the spindle at a creep speed. The load on the motor will increase when the axial end face of the hub of the gear cluster 69 in which the keyway 176 is formed abuts the axial end face of the stationary key 177. However, when engagement of the keyway 176 with the stationary key 177 is accomplished, a much greater load is applied to the motor 53, and in an effort to maintain the motor 53 operating at a creep speed, the pressure of the fluid supplied to the motor will increase. This higher pressure is highly undesirable for it will cause the stationary key 177 to become battered, and after a time, may cause the key to be sheared from its ring body member 178, as previously mentioned. Thus, the valve 200 will be operated so that pressure fluid to the motor 53 is by-passed over the valve 215, which is set so that the torque of the motor 53 is just sufficient to maintain the keyway 176 and key 177 in positive angular engagement, thereby maintaining the spindle 42 in the predetermined angular orientated position.

It is to be noted that the foregoing described arrangement is a preferred embodiment of the invention but modification can be made without departing from the disclosure. For example, the angular orientation of the spindle can be accomplished without the provision of the control valve 200 and the relief valve 215. Without the valves 200 and 215, the fluid circuit including the motor 53 and key 177 would have to be overdesigned to withstand the maximum pressure of which the pump 122 is capable of supplying. The key 177 would have to be of a considerably greater cross-sectional area in order to successfully resist the high impact loads which would be imposed. Furthermore, the pressure of the fluid supplied to the head end of the piston 180 would have to be increased in order to effect disengagement between the keyway 176 and key 177. This is necessary by reason of the fact that maximum pressure will be continued to be supplied to the motor 53 after meshing engagement of the keyway 176 and key 177 has been accomplished. Thus, the torque of the motor 53 is at a maximum, and as a result, the pressure on the abutting surfaces of the faces 211 and 212 of the keyway 176 and key 177, respectively, will be large. This, of course, will necessitate an increase in the pressure which is supplied to the head end of the piston 180 in order to move it axially leftwardly which will be resisted by the greater friction that occurs between the faces 211 and 212 of the keyway 176 and key 177.

A further modification of the preferred embodiment of the invention is one in which the valve 200 is eliminated but wherein the relief valve 215 is retained in the circuit. In this modification, the line 208 would be directly connected to the fluid line 198. With this arrangement, the setting of the adjustable relief valve 215 would be such as to maintain the fluid supplied to the motor 53 at a relatively high pressure sufficient to maintain the motor 53 operating to drive the spindle 42 at a creep speed under the condition wherein the axial face of the gear cluster hub abuts the end face of the stationary key 177. The torque of the motor 53 must be sufficient to overcome the frictional force developed between the abutting surface. When meshing of the keyway 176 and key 177 is effected, the increase in pressure of the fluid supplied to the motor 53 will be relieved over the relief valve 215 thereby insuring that the pressure in the circuit will never exceed the pressure level that has been predetermined as necessary to maintain the motor 53 operating for driving the spindle 42 at a creep speed when the condition is obtained wherein the hub face of the gear cluster abuts the end face of the key 177.

However, the preferred embodiment includes both the relief valve 215 set so as to maintain the pressure to the motor 53 at a value sufficient to maintain the face 211 of the keyway 176 in positive engagement with the face 212 of the key 177 upon the engagement of the keyway 176 with the key 177. When angular positioning of the spindle 42 has been accomplished, the valve 200 will automatically be operated to relieve the motor circuit of excess pressure, maintaining the pressure to the motor at a value just sufficient to maintain an angular urge on the gear cluster 69.

Figure 5:
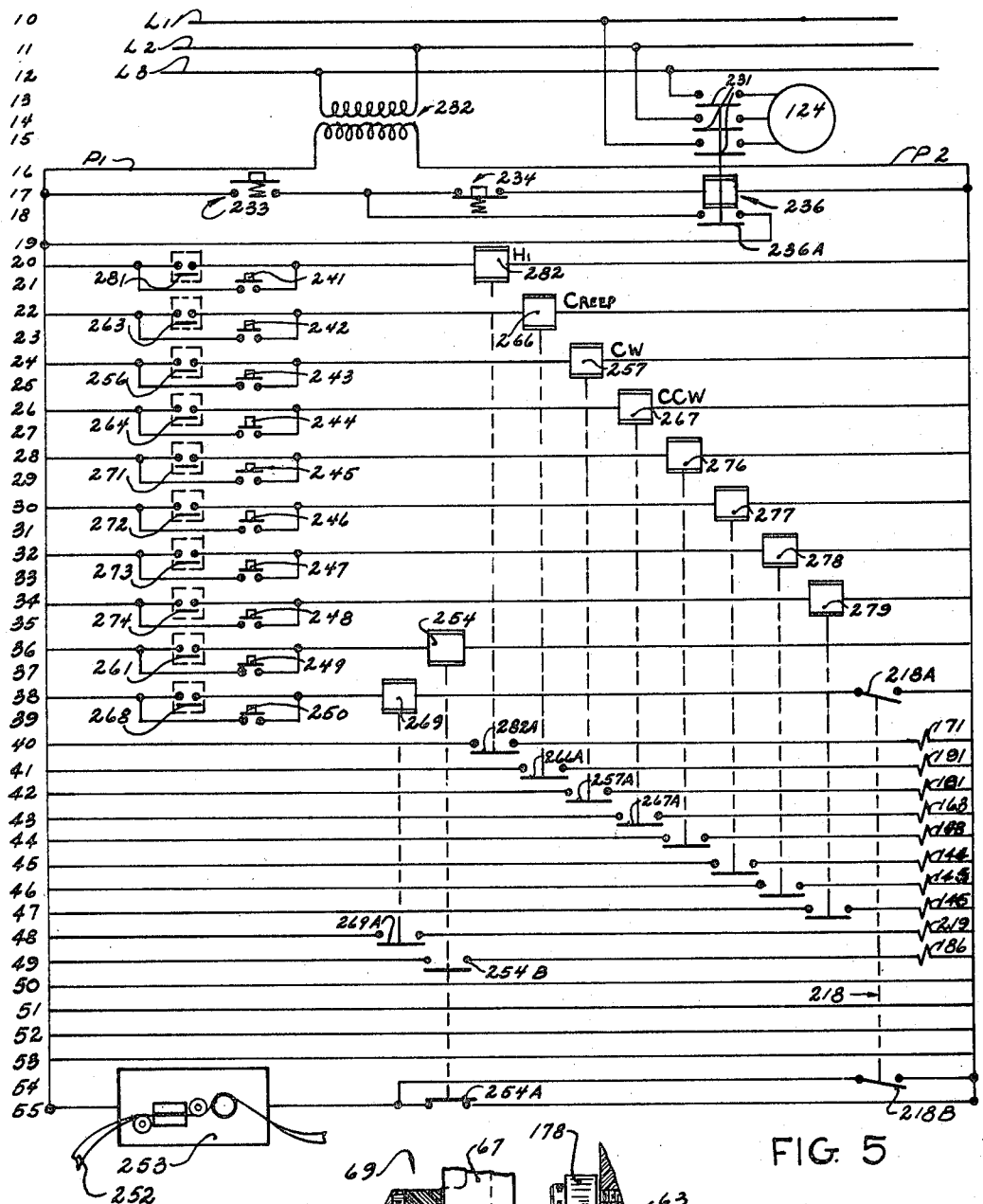
FIG. 5 is a diagrammatic view of a portion of the electrical circuit for effecting the operation of the various solenoid valves.

As illustrated in FIG. 5, power for operating the various electrical components is derived from a three phase source represented by the conductors L1, L2 or L3, which feed current to the normally open contacts 231 in the circuit of the motor 124 that is connected to drive the pumps 121, 122 and 123. In addition, current from the lines L2 and L3 is supplied to the primary of a transformer 232 which has its secondary connected to energize power conductors P1 and P2.

In line 17 of FIG. 5, current flows from the power conductor P1 to the terminal of a normally open pushbutton start switch 233. With the switch 233 actuated, the current flows through the switch contact to the opposite terminal and thence continues along line 17 through the normally closed contact of a stop switch 234. The current continues on through the conductor of line 17 and through the coil of a pump motor starter relay 236 and thence to the energized power conductor P2. With the coil of the starter relay energized, the relay 236 will operate to move its three associated contact bars 231 in lines 13, 14 and 15 to closed positions to energize the motor 124 for driving the pumps 121, 122 and 123. A holding circuit for maintaining the pump motor start relay 236 energized upon subsequent release of the start pushbutton 234 is established from the power conductor P1 along the conductor of line 19 to line 18. The maintaining circuit continues through the now closed contact 236A of the energized relay 236 and along line 18 to line 17. The circuit continues rightwardly along line 17 through the components previously mentioned to the power conductor P2. This circuit by-passes the start switch 233 and the energizing circuit can be interrupted by actuating the stop switch 234.

Energization of the solenoids associated with various valves may be effected manually by actuating various pushbutton switches 241 to 250, inclusive, shown in lines 21, 23, 25, 27, 29, 31, 33, 35, 37 and 39, inclusive, or may be accomplished automatically from signals obtained from a record, such as the punched tape 252 by operation of a tape reader 253. The tape reader 253 operates in a well-known manner to advance the tape past a reading head which will read the tape and produce signals according to the record stored on the tape. The tape reader is energized through a circuit established from the energized power conductor P1 along the conductor of line 55 through the reader and thence through a normally closed contact 254A of a deenergized relay 254. The circuit is completed along the balance of line 55 to the energized power line P2.

For the purpose of this description, it will be assumed that the operation of the machine is under automatic control from signals obtained from the reader 253. It will be further assumed that the previous work operation had been accomplished at a relatively low speed in the low range with the spindle 42 being rotated in a clockwise direction and that the transmission 65 is in the position depicted in FIG. 2. Under this condition, the shifter rods 91 to 94, inclusive, will be in the positions depicted in FIG. 4. Therefore, the solenoids associated with the various valves will all be deenergized so the valves are all in the positions as depicted in FIG. 4. However, since in the previous work operation the spindle 42 was driven in a clockwise direction, the solenoid 161 associated with the valve 152 is energized. As a result, the plunger 160 of the valve 152 will be in a leftwardly position whereby the valve operates to connect the fluid supply line 150 with the line 162 so that the motor 53 is operating to drive the spindle in a clockwise direction.

Under the above assumed conditions, to effect the angular orientation of the spindle 42 into the predetermined angular "3 o'clock" position, signals from the tape 252 will be obtained to deactuate the automatic contact 256 in line 24 to move it to an open position. As a result, the circuit along line 24 will be interrupted to thereby deenergize the coil of the clockwise relay 257. With the relay coil deenergized, the relay 257 operates to move its associated contact 257A in line 42 to its normally open position. With the contact 257A in its open position, the circuit along line 42 is interrupted so that the solenoid coil 161 is deenergized. With the solenoid 161 deenergized, the plunger 160 of the valve 152 will be spring returned to its centered position, as depicted in FIG. 4. With this condition obtained, the output of the pump 123 is returned to the reservoir 125 via the lines 165 and 158.

Angular positioning of the spindle 42 to the preselected "3 o'clock" position is effected automatically by signals received from the tape 252. To this end, the tape 252 is moved through the reader 253 to advance a block of information through the reader for obtaining signals which will effect the operation of the various control valves. With the block of tape advanced through the reader, a signal obtained from the tape will actuate an automatic contact 261 in line 36 to a closed position. With the contact 261 in a closed position, a circuit is completed so that current flows from the energized power conductor P1 along the conductor of line 36 through the now closed automatic contact 261. The current continues to flow rightwardly through the conductor of line 36 and passes through the coil of the spindle positioning relay 254 and thence rightwardly along the conductor of line 36 to the energized power line P2 to complete the circuit to energize the coil of the relay 254. With the coil of the relay 254 energized, the relay operates and moves its associated normally closed contact 254A in line 55 to an open position thereby interrupting the power circuit to the tape reader 253. This will insure that the tape reader cannot operate to advance a further block of information until the spindle 42 is angularly oriented.

Simultaneously with the movement of the contact 254A to an open position, another contact 254B in line 49 of the relay 254 is moved to a closed position. With the contact 254B in a closed position, a circuit is completed from the power conductor P1 along the conductor of line 49 to energize the solenoid 186 associated with the control valve 185. As previously mentioned, energization of the solenoid 186 moves the valve plunger 189 leftwardly so that the valve 185 operates to connect the cylinder 181 at the head side of the piston 180 to the reservoir 125. This will release the piston 180 so that it is free to move rightwardly from the position it occupies, as shown in FIG. 4. At this time, the solenoid 148 associated with the valve 133 is deenergized so that the valve 133 operates to connect the cylinder 106 at the head end of the piston 102 to the reservoir 125. Therefore, with no pressure fluid acting on either of the pistons 102 or 180, the pressure fluid supplied to the cylinder 97 and acting on the relatively small diameter piston end of the rod 91 will effect rightward movement of the shifter rod 91 and the gear cluster 69. Since the gear cluster 69 is in its low range position wherein the gear 67 is in meshing engagement with the gear 71, the further rightward movement of the shifter rod 91 will cause the gear cluster 69 to move further rightwardly to effect the engagement of the keyway 176 with the stationary key 177.

Simultaneously with the signal from the tape 252, which effects the closing of the automatic contact 261, other signals from the tape are obtained to effect a closing of automatic contacts 263 and 264 in lines 22 and 26, respectively. With the automatic contact 263 moved to its closed position, a circuit is completed from the power conductor P1 to the power conductor P2 via the conductor of line 22 to effect the energization of the coil of a motor speed control relay 266. Thereupon the relay 266 operates to move its associated normally open contact 266A in line 41 to a closed position. With the contact 266A in closed position, a circuit is completed between the power conductors P1 and P2 via the circuit of line 41 to energize the creep speed solenoid 191. With the solenoid 191 energized, the valve 156 operates to direct the pressure fluid from the pump 122 into the line 192 from whence it is distributed to the motor 53 to effect the operation of the motor at a creep speed, as previously described. Simultaneously therewith, the now closed automatic contact 264 operates to complete a circuit along the line 26 to effect the energization of the coil of a counterclockwise directional relay 267. With its coil energized, the relay 267 operates to move an associated normally open contact 257A in line 43 to a closed position. This immediately completes a circuit along line 43 to effect the energization of the solenoid 163 associated with the valve 152. The valve 152 is thereupon operated to place the line 162 in communication with the return line 165 so that exhaust fluid from the motor 53 is returned to the reservoir 125.

The switch 218 will be activated upon the engagement of the keyway 176 with the stationary key 177. Actuation of the switch 218 will serve to move a pair of associated normally open contacts 218A and 218B in lines 38 and 54, respectively, to closed positions. Subsequent to the actuation of the switch 218, an automatic contact 268 in line 38 will have been moved to a closed position by a signal obtained from the tape. Thus, upon the movement of the contact 218A to a closed position, a circuit along line 38 is completed to effect the energization of the coil of the pressure reduce relay 269. The relay 269 thereupon operates to move its associated normally open contact 269A in line 48 to a closed position. As a result, a circuit is completed along line 48 to effect the energization of the solenoid 219 associated with the pressure bypass valve 200. With the solenoid 219 energized, the valve 200 is operated so as to connect the fluid line 198 with the fluid line 208. As previously described, a reduction in the pressure in the fluid line 205 will be obtained so that the torque of the motor 53 is reduced to a predetermined relatively small force which is sufficient to maintain the face 211 of the keyway 176 in positive engagement with the face 212 of the stationary key 177. This will serve to maintain the spindle 42 in the predetermined angularly orientated position for a tool interchange operation.

Simultaneously with the movement of the contact 218A to a closed position, the companion contact 218B in line 54 is also moved to a closed position. With the contact 218B in a closed position, a circuit around the now open contact 254A in line 55 is completed. Thus, the tape reader 253 is again energized and operates to advance the tape 252 to present another block of information so as to effect another function automatically, such as a tool interchange operation.

After the arm 48 has been operated to effect an interchange of tools between the magazine 35 and the spindle 42 and has been returned to the horizontal parked position depicted in FIGURE 1, signals from the tape 252 will be obtained to move the automatic contacts 261, 263, 264 and 268 in lines 36, 22, 26 and 38, respectively, to their open positions whereupon the coils of the relays 254, 266, 267 and 269 in lines 36, 22, 26 and 38, respectively, are deenergized. As a result, the relays 254, 266, 267 and 269 operate to move their associated contacts 254A, 254B, 266A, 267A and 269A in lines 55, 49, 41, 43 and 48, respectively, to their normal positions as depicted in FIG. 5.

With the contact 254B returned to its normal open position, the solenoid 186 associated with the valve 185 will be deenergized and the valve plunger 189 is biased into its normal rightward position so that the valve 185 operates to connect the pressure fluid supply line 184 with the fluid line 187. As a result, pressure fluid will be directed to the cylinder 181 at the head end of the piston 180 therein and will force the piston to move leftwardly its full limit of travel. The piston 180 in moving leftwardly will, in turn, through its associated rod 223 engage the head end of the piston 102 forcing it to move leftwardly. This leftward movement of the piston 102 will effect leftward movement of the gear cluster 69 a distance sufficient to effect the disengagement of the keyway 176 from the stationary key 177, but is not sufficient to effect the disengagement of the low range drive as established through the engagement of the gears 67 and 71.

With the contacts 263 and 264 returned to open positions, the associated relays 266 and 267 will be deenergized. The deenergized relays 266 and 267 thereupon operate to move their associated contacts 266A and 267A in lines 41 and 43, respectively, to their normal open positions. As a result, the solenoids 191 and 163 are both deenergized. With the solenoid 191 associated with the valve 156 and the solenoid 163 associated with the directional valve 152 both deenergized, the associated valves 156 and 152 are positioned so that the pressure fluid from the pumps 122 and 123 is returned to the reservoir as previously described.

With the automatic contact 268 moved to its open position, the coil of the relay 269 will be deenergized. The relay 269 will now operate to move its associated contact 269A in line 48 to an open position. With the contact 269A returned to its open position, the circuit along line 48 is interrupted and the solenoid 219 is deenergized. As a result, the valve 200 operates and blocks the flow of fluid therethrough and connects the line 208 to the branch return line 226.

When the shifter rod 91 is moved leftwardly by the operation of the stop piston 180, the rod 221 will move leftwardly with the shifter fork 86 thereby deactuating the switch 218. With the switch 218 deactuated its associated contacts 218A and 218B in lines 38 and 54 of FIG. 5 are moved to their normal open positions. At this time, the contact 254A is in its normal closed position having been so positioned at the time that its associated contact 254B had been moved to its open position. Thus, a circuit for maintaining the tape reader energized is established around the now open contact 218B.

Another block of tape is now advanced through the tape reader 253 to provide recorded information for the next machining operation wherein the spindle speed will be selectively established by selective operation of the automatic contacts 271 to 274, inclusive. The actuation of the automatic contacts 271, 272, 273 and 274, either selectively or in combination, will serve to energize the speed selecting relays 276 to 279, inclusive, either selectively or in combination. This, in turn, will effect the energization of the solenoids 144, 145, 146 and 148, either selectively or in combination, for effecting the operation of the shifter rods 91, 92, 93 and 94, respectively, in a desired combination to establish a desired spindle speed, either in low speed range or high speed range.

Likewise, an automatic control 281 in line 20 may be selectively operated to effect the energization of high speed relay 282. If the high speed relay 282 is energized, it will operate to move its associated contact 282A in line 40 to a closed position. This will serve to complete an energizing circuit to effect the energization of the solenoid 171 associated with the valve 156. With the solenoid 171 energized, the valve 156 will be positioned so that it operates to direct the output of the pump 122 into the fluid line 172 so that it will flow into the line 151 and combine with the pressure fluid from the pump 123. Thus, the combined output of the pumps 122 and 123 will be supplied to the motor 53 upon the subsequent operation of the valve 152 so that the motor 53 will be operated at its highest speed.

From the foregoing detailed description of the illustrative embodiment set forth herein to exemplify the present invention, it will be apparent that there has been provided an improved machine tool incorporating an improved positive operating mechanism for effecting spindle angular orientation which is automatically operable in its function.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the sub-joined claims.

The principles of this invention having now been fully explained in connection with the foregoing description, we hereby claim as our invention:

1. In a machine tool having a frame;
    a tool receiving spindle rotatably supported by said frame;
    a spindle drive motor;
    mechanical locking means operable to engage said spindle for stopping its rotation and locking it in a predetermined angularly orientated position when actuated;
    a driving member connected to receive the output of said motor for driving said spindle, said driving member being movable to actuate said locking means for locating said spindle in a predetermined angularly orientated position; and,
    means to move said driving member.

2. A machine tool according to claim 1 wherein said spindle drive motor is a fluid motor, and said spindle drive means includes:
    a source of pressure fluid;
    a fluid circuit connected to supply pressure fluid from said source of pressure fluid to said spindle drive motor to rotate it; and,
    a relief valve in said circuit operable to maintain the pressure in said circuit at a predetermined value for maintaining the driving torque of said motor at a predetermined value.

3. A machine tool according to claim 1 wherein said spindle driving member is provided with a keyway;
    and there is provided a stationary key carried by the frame with which the keyway in said spindle driving member is engageable to lock said spindle in a predetermined angularly orientated position; and,
    said driving member is movable to effect the engagement of its keyway with said stationary key without interrupting the drive connection between said motor and said spindle.

4. A machine tool according to claim 3 wherein said moving means operates to effect the axial movement of said driving member in one direction to engage the keyway thereof with said stationary key to effect the angular positioning of said spindle in a predetermined orientated position.

5. A machine tool according to claim 4 wherein said moving means includes a shifting fork operated by pressure fluid to effect the movement of said driving member into engagement with said stationary key.

6. A machine tool according to claim 2
    wherein said source of pressure fluid includes fluid circuit means to receive the fluid under pressure and direct the pressure fluid to said motor; and,
    means in said circuit operable prior to the movement of said spindle driving member actuating said locating means to by-pass some of the fluid being supplied to said motor so that said motor operates to drive said spindle at a creep speed.

7. A machine tool according to claim 6 wherein there is included,
    a pressure relief valve connectible into said motor circuit and operable to relieve the pressure in said motor circuit when the pressure exceeds a predetermined value;
    a valve means normally operating to block the flow of fluid to said relief valve and operable when actuated to connect said pressure relief valve into said motor circuit; and,
    sensing means operable upon the positioning of said spindle at the desired predetermined angularly orientated position to effect the actuation of said valve means to connect said pressure relief valve to said motor circuit to thereby effect a reduction of the pressure of the fluid supplied to said motor,
        whereby the output torque of the motor will be reduced to a value which is sufficient to maintain said spindle driving means and said locking means in engagement to maintain said spindle in the angularly orientated position.

8. A machine tool according to claim 1 wherein said spindle driving member is movable into a first spindle drive position;
    and there is included a movable stop member normally operable to limit the movement of said driving member to a predetermined amount of travel when it is moved into the first spindle drive position; and,
    means operable to render said stop member ineffective,
        whereby said moving means is operable to move said driving member an additional amount in the first spindle drive position to effect and engagement of said driving member with said locking means while said driving member is maintained in spindle driving engagement.

9. A machine tool according to claim 8 wherein said movable stop includes a piston biased into a position wherein it operates to limit the travel of said driving member is moved to the first spindle drive position;
    a source of pressure fluid;
    a fluid circuit connecting said source of pressure fluid to one side of said stop piston;
    a directional flow control valve in said circuit normally operating to direct the pressure fluid from said source to the one side of said stop piston, said directional flow control valve being operable when actuated to block the flow of pressure fluid to the one side of said stop piston and to connect the one side to a reservoir, whereby the stop piston normally operates to limit the movement of said driving member to the first drive position and the restriction imposed by said stop piston may be removed to permit said driving member to be moved an additional amount by said moving means to effect the engagement of said driving member with said locking means to stop said spindle in a predetermined angularly orientated position while maintaining a drive connection between said driving member and said spindle.

10. A machine tool according to claim 1 including a shiftable gear transmission in which said driving member is the range change gearing shiftable between a high range drive position and a low range drive position for driving said spindle at a selected one of a plurality of speeds in a high range or in a low range;

a fluid actuated shifter connected to effect the movement of said range change gearing between its high and low range positions selectively;

a source of pressure fluid;

a first circuit means connecting said source to one side of said shifter to urge it in a direction to position said range change gearing in the low range position;

a stop piston in position to engage with said shifter;

a second circuit means connecting said source of pressure to one side of said stop piston to urge said stop piston in a direction to engage it with said shifter;

a fluid flow directional valve in said second circuit normally operating to direct the pressure fluid from said source to the one side of said stop piston, said directional valve being operable when actuated to block the flow of pressure fluid from said source to the one side of said stop piston and to connect the one side of said stop piston to the reservoir;

means to actuate said fluid flow directional valve to thereby connect said one side of said shifter to reservoir so that the pressure fluid supplied to said shifter via said first circuit means will operate to move said shifter and said range change gearing an additional amount;

stationary means engageable by said range change gearing to lock said spindle in a predetermined angularly orientated position when said range change gearing is moved the additional amount by said shifter; and, means to deactuate said directional valve so that said valve operates to direct pressure fluid to the one side of said stop piston to thereby effect movement of said stop piston to move said shifter in opposition to the pressure fluid supplied to said shifter via said first circuit means and thereby effect the movement of said range change gearing to disengage it from said stationary locking means to free said spindle for rotation.

11. In a machine tool having a frame;

a tool receiving spindle rotatably supported by the frame;

means connected to drive said spindle at a driving torque;

mechanical locking means operable to engage said spindle for stopping its rotation and locking it in a predetermined angularly orientated position when actuated;

means to actuate said locking means; and, means operably connected to effect a reduction in the output driving torque of said drive means to a torque value which is sufficient to maintain said mechanical locking means in intimate engagement with said spindle to maintain said spindle in the angularly orientated position.

References Cited

UNITED STATES PATENTS 2,646,152   7/1953   Retz _____ 29—38.2

RICHARD H. EANES, *Primary Examiner.*

U.S. Cl. X.R.

29—568; 77—3